United States Patent
Hoffmann et al.

(10) Patent No.: US 9,869,393 B2
(45) Date of Patent: Jan. 16, 2018

(54) SHAFT SEAL, ESPECIALLY RADIAL SHAFT SEAL

(71) Applicant: KACO GmbH + Co. KG, Heilbronn (DE)

(72) Inventors: Tobias Hoffmann, Talheim (DE); Matthias Podeswa, Beilstein (DE)

(73) Assignee: KACO GmbH + Co. KG, Heilbronn (DE)

( * ) Notice: Subject to any disclaimer, the term of this patent is extended or adjusted under 35 U.S.C. 154(b) by 0 days.

(21) Appl. No.: 13/744,746

(22) Filed: Jan. 18, 2013

(65) Prior Publication Data
US 2013/0193649 A1   Aug. 1, 2013

(30) Foreign Application Priority Data
Jan. 19, 2012 (DE) .................. 10 2012 001 226

(51) Int. Cl.
| | |
|---|---|
| *F16J 15/3208* | (2016.01) |
| *F16J 15/3232* | (2016.01) |
| *F16J 15/324* | (2016.01) |
| *F16J 15/3244* | (2016.01) |
| *F16J 15/3228* | (2016.01) |

(52) U.S. Cl.
CPC ........ *F16J 15/3208* (2013.01); *F16J 15/324* (2013.01); *F16J 15/3228* (2013.01); *F16J 15/3232* (2013.01); *F16J 15/3244* (2013.01)

(58) Field of Classification Search
CPC .. F16J 15/3268; F16J 15/3256; F16J 15/3228; F16J 15/324

USPC ................. 277/551, 559, 570, 561, 569, 353
See application file for complete search history.

(56) References Cited

U.S. PATENT DOCUMENTS

| | | | | |
|---|---|---|---|---|
| 2,316,941 A | * | 4/1943 | Dodge | F16J 15/3208 277/346 |
| 3,099,454 A | | 5/1961 | Walinski | |
| 4,623,153 A | * | 11/1986 | Nagasawa | F16J 15/322 277/551 |
| 5,350,181 A | * | 9/1994 | Horve | F16J 15/3264 277/559 |
| 5,553,866 A | * | 9/1996 | Heinzen | F16J 15/3264 277/551 |
| 5,860,656 A | * | 1/1999 | Obata | F16J 15/3232 277/549 |

(Continued)

FOREIGN PATENT DOCUMENTS

| | | |
|---|---|---|
| DE | 26 06 127 A1 | 9/1976 |
| DE | 102008 010 338 A1 | 2/2009 |

(Continued)

*Primary Examiner* — Kristina Fulton
*Assistant Examiner* — L. Susmitha Koneru
(74) *Attorney, Agent, or Firm* — Gudrun E. Huckett

(57) ABSTRACT

A shaft seal that is preferably a radial shaft seal has a sealing element of polyfluorocarbon that is provided with a sealing lip. The sealing element contacts a surface to be sealed under a radial force action acting in a radial direction of the shaft seal. An elastomer element is provided that is acting on the sealing lip and loads the sealing lip in a direction toward the surface to be sealed. The elastomer element supports the sealing element. The sealing element is resting flat on a face of the elastomer element, wherein the face is facing away from a medium side of the shaft seal.

17 Claims, 9 Drawing Sheets

(56) References Cited

U.S. PATENT DOCUMENTS

| | | | | |
|---|---|---|---|---|
| 6,123,514 | A * | 9/2000 | Kawaguchi | F04B 27/1036 277/559 |
| 6,170,833 | B1 * | 1/2001 | Cox | F16J 15/3244 277/551 |
| 6,209,879 | B1 * | 4/2001 | Mizunoya | F16J 15/3232 277/352 |
| 6,334,618 | B1 * | 1/2002 | Ohta | F16J 15/3244 277/549 |
| 6,367,811 | B1 * | 4/2002 | Hosokawa | F16J 15/3216 277/560 |
| 6,517,082 | B2 * | 2/2003 | Yamada | F16J 15/322 277/559 |
| 6,517,083 | B2 * | 2/2003 | Yamada | F16J 15/3244 277/559 |
| 7,055,824 | B2 * | 6/2006 | Kobayashi | F16J 15/3284 277/309 |
| 7,467,797 | B2 * | 12/2008 | Oiyama | F16J 15/3228 277/553 |
| 8,096,559 | B2 * | 1/2012 | Cook | F16J 15/3212 277/353 |
| 8,256,772 | B2 * | 9/2012 | Itadani | F16J 15/322 277/353 |
| 8,579,297 | B2 * | 11/2013 | Arita | F16J 15/3232 277/551 |
| 2001/0030398 | A1 * | 10/2001 | Hosokawa | F16J 15/002 277/549 |
| 2004/0227303 | A1 * | 11/2004 | Bock | F16J 15/3256 277/549 |
| 2007/0052180 | A1 * | 3/2007 | Watanabe | F16J 15/322 277/551 |
| 2007/0284831 | A1 | 12/2007 | Kurth | |
| 2009/0289418 | A1 * | 11/2009 | Cook | F16J 15/3212 277/309 |
| 2014/0210166 | A1 * | 7/2014 | Balsells | F16J 15/3212 277/562 |

FOREIGN PATENT DOCUMENTS

| | | |
|---|---|---|
| EP | 0 031 231 A1 | 7/1981 |
| EP | 0 218 394 A2 | 4/1987 |
| JP | 61-172258 | 10/1986 |
| JP | H02 71172 U | 5/1990 |
| JP | H03 44268 U | 4/1991 |
| JP | 2002-005305 | 1/2002 |
| JP | 2009 197 883 A | 9/2009 |

* cited by examiner

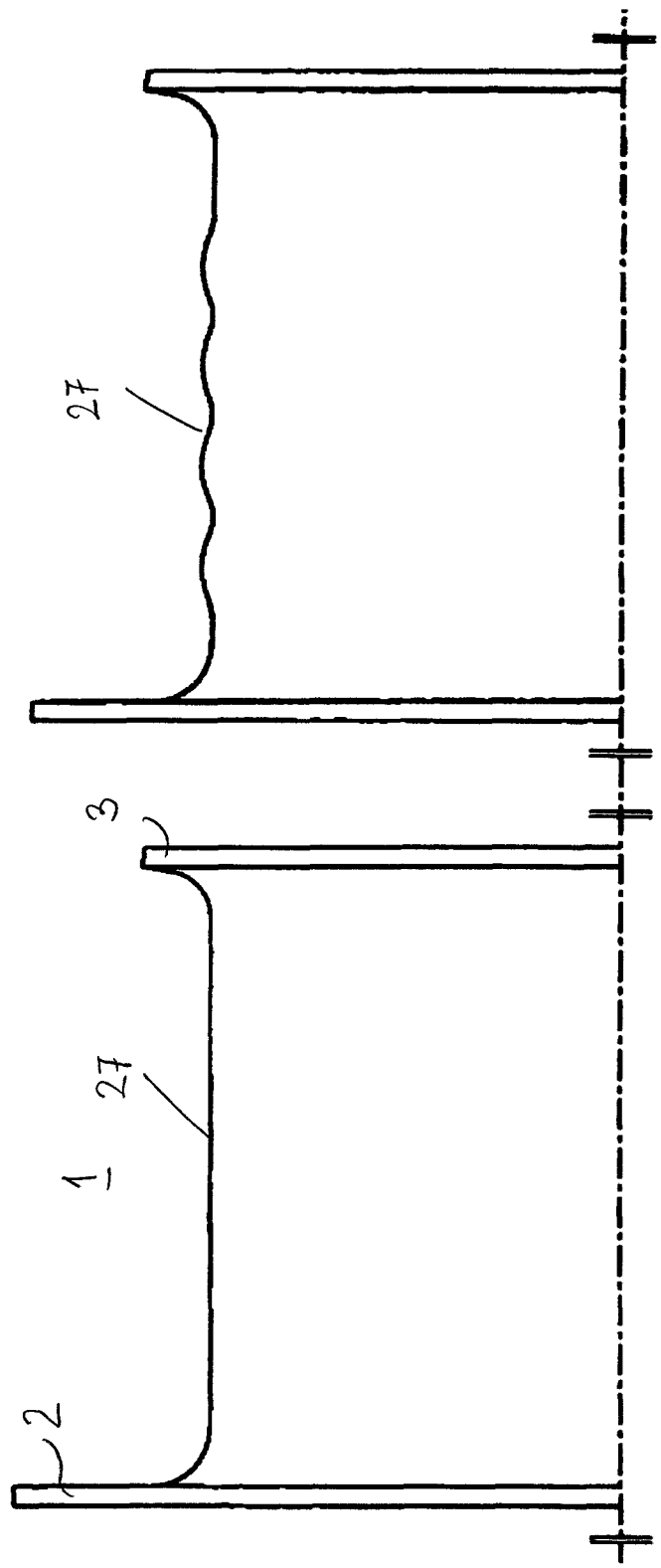

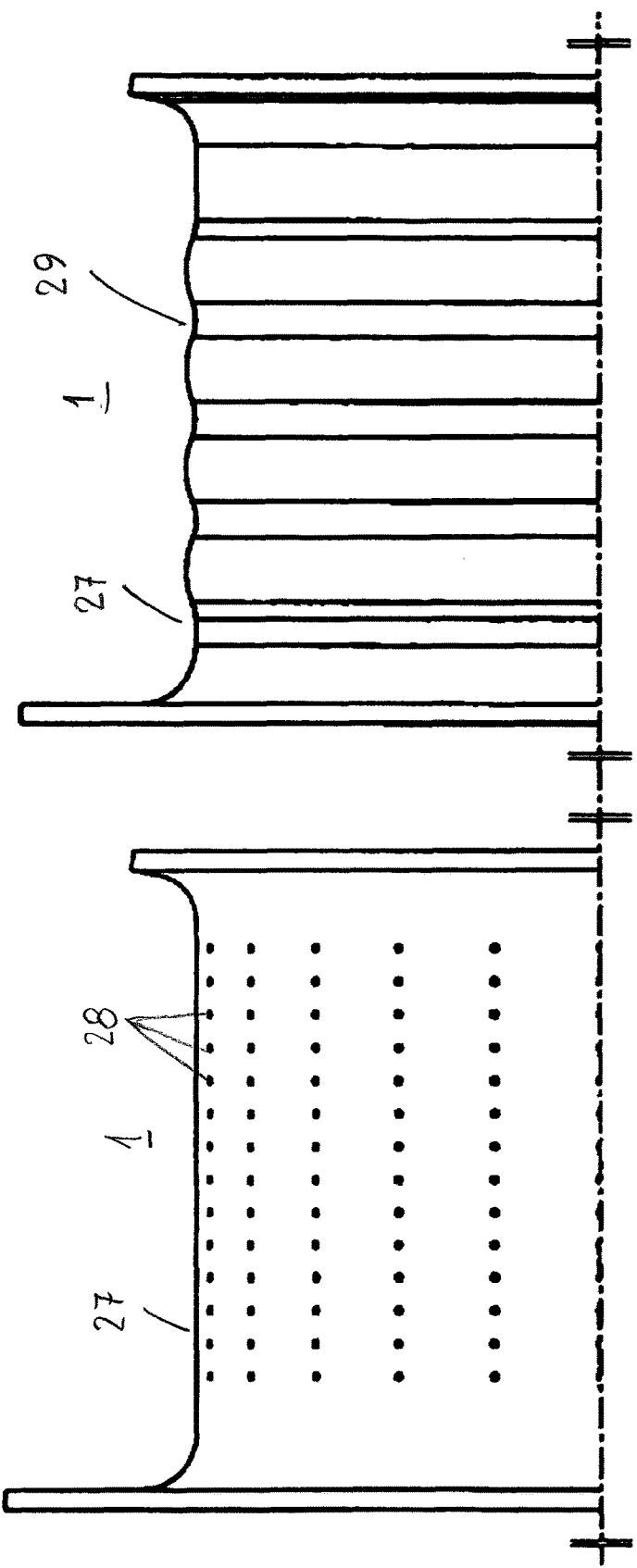

SHAFT SEAL, ESPECIALLY RADIAL SHAFT SEAL

BACKGROUND OF THE INVENTION

The invention concerns a shaft seal, in particular a radial shaft seal, with at least one sealing element of polyfluorocarbon, preferably polytetrafluoroethylene, that is provided with a sealing lip that is contacting a surface to be sealed under radial force action.

In shaft seals in the form of radial shaft seals, polyfluorocarbon, in particular polytetrafluoroethylene, is used as a material for the sealing elements because of its special physical and chemical properties. The sealing elements are embodied as annular disks whose radial inner area is elastically bent for forming the sealing lip. In case of polyfluorocarbons, in particular polytetrafluoroethylene, creeping can be observed. Moreover, these materials have a relatively minimal mechanical strength. Creeping of this material has the result that the sealing action decreases. In order to counteract this creeping action, the radial pretension that is acting on the sealing lip is therefore increased. This causes however a correspondingly greater wear of the sealing lip. In sealing applications, it is therefore difficult to find a balance between seal-tightness and wear.

In order to achieve this balance, it is known to add to the sealing element different fillers, for example, glass fibers, carbon fibers, bronze and the like. These additives however require a complex and expensive manufacture.

The invention has the object to configure the shaft seal of the aforementioned kind in such a way that its seal-tightness during its period of use is substantially maintained while its manufacture is constructively simpler and less expensive.

SUMMARY OF THE INVENTION

In accordance with the invention, this object is solved for the shaft seal of the aforementioned kind in that the sealing lip is loaded by at least one elastomer element in the direction of the surface to be sealed.

In the shaft seal according to the invention, the sealing lip of the sealing element is loaded by the elastomer element in the direction of the component to be sealed. In this way, it is ensured that the sealing lip is always contacting with sufficient force the surface to be sealed. Should the material of the sealing element creep, this has no effect on the radial contact force of the sealing lip because the elastomer element ensures that the sealing lip is always contacting with sufficient contact force the surface to be sealed.

The shaft seal according to the invention that is preferably a radial shaft seal is suitable excellently for use in automotive engineering. Thus, the shaft seal according to the invention can be used, for example, in cooling agent pumps of motor vehicles. The shaft seal according to the invention can be used in a pressure range of, for example, approximately 10 mbar up to approximately 3,500 mbar. As a cooling agent, for example, OAT, SOAT, SOAT with glycerin, but also pure water are conceivable for which the shaft seal can be used. The shaft seal according to the invention can be used within a temperature range of approximately −30° C. up to approximately 125° C. without problems. As a result of the configuration according to the invention, the shaft seal has an excellent leakage behavior that has a value of substantially less than 3 g/100 h. The shaft seal is characterized moreover by a very good noise behavior during use which is resulting from the use of the elastomer part that provides a vibration-damping action.

Advantageously, the elastomer element supports the sealing element.

In a preferred embodiment, the sealing element is resting flat against the face of the elastomer element which is facing away from the medium side. The sealing element is thus protected by the elastomer element. Moreover, a high vibration damping action is achieved in this way.

An advantageous embodiment results when the elastomer element is arranged between a housing part and the sealing element and is contacting the housing part as well as the sealing element. The elastomer element is then securely held within the housing of the shaft seal.

In order for the sealing lip of the sealing element to be pressed simply and reliably against the surface to be sealed, it is advantageous when the elastomer element with a lip-type part is contacting the sealing lip of the sealing element under radial force action. The lip-type configuration of this part of the elastomer element enables an optimal force transmission. The lip-shaped configuration makes it possible that this part of the elastomer element can be optimally bent elastically so that a sufficient pretension is made available.

The elastomer element can be designed such that the radial force is exerted only by means of the lip-type part onto the sealing lip. In a preferred embodiment, the lip-type part of the elastomer element is loaded by at least one spring in radial direction. This spring is advantageously an annular spring that engages the lip-type part about its circumference. By means of the spring it is ensured that at any time a sufficiently high radial force is exerted on the sealing lip of the sealing element.

A reliable positional securing action of the sealing element within the housing is provided when the sealing element is contacting at least one support element. In this case, the sealing element is positioned between the elastomer element and the support element so that it is reliably secured between the two elements.

In an advantageous embodiment, the support element is formed by an annular disk. It occupies only little space so that the shaft seal can be of compact configuration. Moreover, the annular disk-shaped configuration of the support element contributes to a simple and inexpensive manufacture of the shaft seal.

The support element is advantageously attached with its radial outer rim on the housing so that the support element does not change its mounting position so that the sealing element during the service life of the shaft seal reliably performs its sealing function.

The sealing element is advantageously an annular disk that occupies little space and contributes to an advantageous and inexpensive manufacture of the shaft seal.

A reliable support of the sealing element results when the support element contacts the radially extending part of the sealing element as well as the transition from the radially extending part into the sealing lip of the sealing element.

The surface to be sealed can be the wall surface of a shaft or an axle on which the sealing lip of the sealing element is resting.

The surface to be sealed can however also be the wall surface of a running sleeve that is fixedly secured on the shaft/axle.

An optimal sealing action results when two sealing elements are provided axially adjacent to each other and with one face are contacting a support element, respectively.

In this case, it is advantageous when the sealing element is contacting an elastomer element with its other face.

The elastomer element has advantageously a rotational direction-dependent or rotational direction-independent structure or geometry relative to the sealing element. Then, a return conveying action of the medium to be sealed either only in one rotational direction or in both rotational directions takes place.

In an advantageous embodiment, the sealing lip also has a rotational direction-dependent or rotational direction-independent structure or geometry. Then, depending on the application situation, the medium to be sealed can also return by means of the structure or geometry of the sealing lip in one rotational direction or independent of the rotational direction.

This structure or geometry can be provided on the running side and/or on the outer side of the sealing lip.

The shaft seal according to one embodiment is designed such that the wall surface of the running sleeve is profiled. In an advantageous embodiment, this profiled structure can be embodied to be wave-shaped. In this way, between the profiled structure of the running sleeve and the sealing lip resting thereon, lubricating pockets can be formed that ensure a reliable lubrication of the sealing lip resting on the running sleeve.

In another advantageous embodiment, the running sleeve can also be provided with punctiform depressions in its outer side. They can also be used advantageously as lubricant pockets.

In a particularly advantageous embodiment, the profiled structure of the running sleeve is designed as swirl structure with which a return conveying action of the medium in the direction toward the medium side is achieved. This swirl structure can be designed advantageously such that it is effective only in one rotational direction of the shaft or also in both rotational directions of the shaft.

The subject matter of the application not only results from the subject matter of the individual claims but also from all specifications and features that are disclosed in the drawings and the description. Even if they are not the subject matter of the claims, they are claimed as important to the invention inasmuch as they are new, individually or in combination, relative to the prior art.

Further features of the invention result from the additional claims, the description, and the drawings.

BRIEF DESCRIPTION OF THE DRAWINGS

The invention will be explained in the following with the aid of some embodiments illustrated in the drawings in more detail. It is shown in:

FIG. 1 to FIG. 4 one half of a running sleeve of a shaft seal according to the invention, respectively;

DESCRIPTION OF PREFERRED EMBODIMENTS

Figure 5:
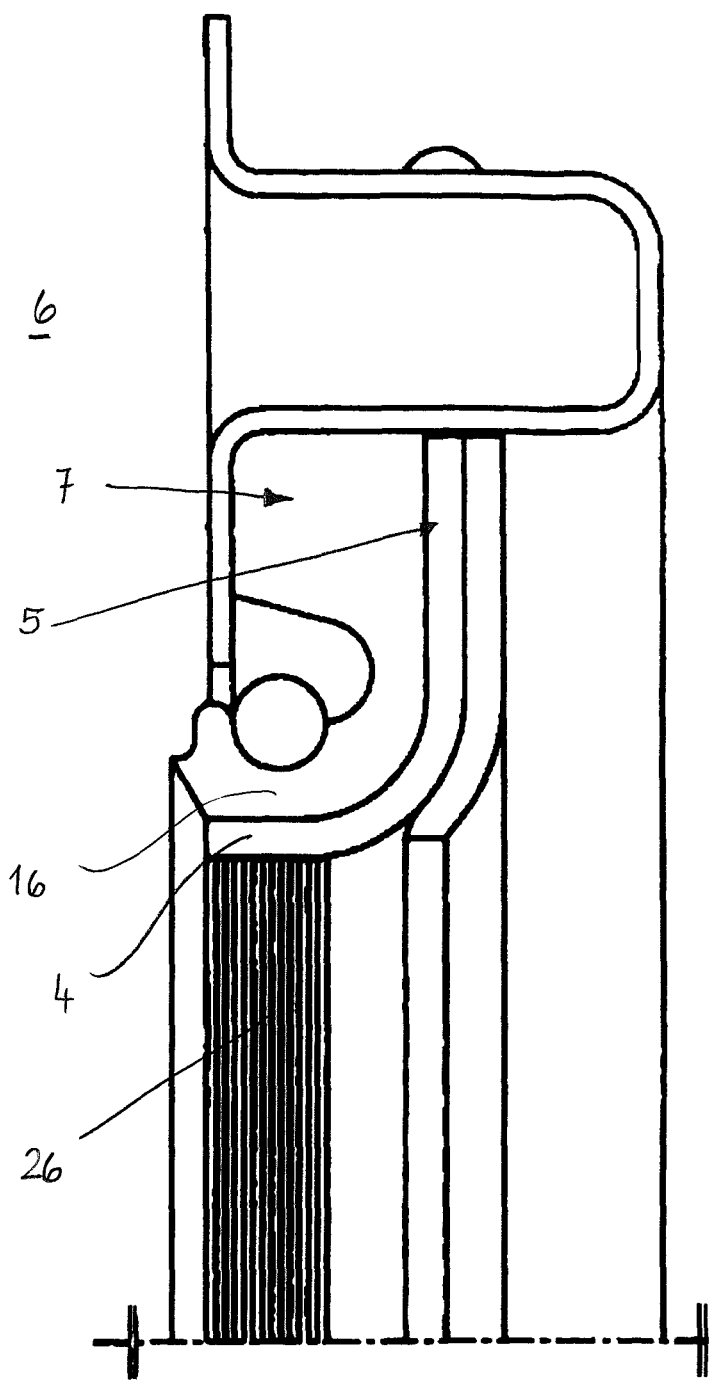
FIG. 5 to FIG. 10 in axial section, respectively, one half of different embodiments of shaft seals according to the invention.

The complete configuration of the shaft seal that is preferably a radial shaft seal will be explained with the aid of FIG. 8. The shaft seal has a running sleeve 1 which is seated fixedly on the shaft (not illustrated) to be sealed. The running sleeve 1 is seated preferably with press fit on the shaft to be sealed. At one end, the running sleeve 1 has a radially outwardly oriented flange 2. The other end 3 of the running sleeve 1 can be widened to a funnel shape. The radial width of the annular flange 2 is greater than the radial width of the widened end 3. A sealing lip 4 of a sealing element 5 is contacting seal-tightly with radial pretension the cylinder-shaped outer side of the running sleeve 1. The sealing element 5 is advantageously a sealing disk whose radial inwardly positioned area is elastically bent for forming the sealing lip 4. The sealing element 5 is comprised advantageously of polyfluorocarbon, preferably polytetrafluoroethylene. The sealing lip 4 is elastically bent in the direction toward the medium side 6.

On the face that is facing the medium side 6, the sealing element 5 is covered by an elastomer element 7. It is contacting across its entire radial width the sealing element 5. The elastomer element 7 is comprised of elastic plastic material or rubber-like material.

The elastomer element 7 is axially contacting a radial inwardly oriented annular flange 8 of a housing 9. The annular flange 8 passes into an inner cylinder part 10 which at the end that is facing away from the annular flange 8 passes by means of a radial outwardly extending annular flange 11 into an outer cylinder part 12. Its free end passes into a radial outwardly oriented annular flange 13. With the latter, the housing 9 is contacting in the mounted position of the shaft seal in a known way a side of device that is provided with a receptacle for the shaft seal. The housing 9 is advantageously monolithic and is comprised advantageously of metallic material. Depending on the field of application of the shaft seal, the housing 9 can also be comprised of hard plastic material.

The radial inwardly oriented annular flange 8 overlaps, viewed in axial direction of the shaft seal, the annular flange 2 of the running sleeve 1 that has a spacing from the annular flange 8. The elastomer element 7 projects with its free end 14 into a central opening 15 of the annular flange 8. In the illustrated embodiment, the free end 14 projects slightly past the annular flange 8 in the direction toward the annular flange 2. Between the free end 14 of the elastomer element 7 and the rim of the opening 15 as well as the annular flange 2 there is only a small spacing.

The part 16 of the elastomer element 7 that is contacting the sealing lip 4 is formed like a sealing lip. It is resting across the entire width of the sealing lip 4 and exerts a radial force onto the sealing lip 4. The sealing lip 4 is in this way reliably pressed against the outer side of the running sleeve 1 so that the medium to be sealed is reliably retained. In order to achieve an optimal radial contact force, the sealing lip part 16 of the elastomer element 7 is loaded by an annular spring 17 that is provided in an annular groove 18 in the outer side of the sealing lip part 16. The wall of the an annular groove 18 surrounds the annular spring 17 across approximately 180° so that it is reliably held in the mounted position. The annular spring 17 ensures that the sealing lip 4 of the sealing element 5 is always resting with sufficient radial force on the outer side of the running sleeve 1. The annular spring 17 is located within the housing 9.

The annular spring 17 is positioned in a receiving space 30 of the elastomer part 7. It is delimited at one end face partially by the annular flange 8 of the housing 9. On the axial opposite side the receiving space 30 is delimited by a sidewall 31 that passes tangentially relative to the annular spring 17 into the wall of the annular groove 18. The sidewall 31 is positioned parallel to the annular flange 8 of the housing 9 and passes by means of a radial slantedly outwardly extending wall 32 into an end face 33 with which the elastomer part 7 is resting flat on the inner face of the annular flange 8.

A support disk 19 is contacting a face of the sealing element 5 that is facing away from the elastomer element 7. It extends radially up to the cylinder part 10 of the housing 9 on which the support disk 19 is advantageously fastened.

When the support disk 19 is comprised of metallic material, it is advantageously welded to the cylinder part. The support disk 19 is positioned with its radial inner area 20 flat against the transition area of the sealing element 5 into the sealing lip 4.

The sealing element 5 is arranged in the described way between the elastomer element 7 and the support disk 19 and contacts them, respectively.

The support disk 19 and/or the elastomer element 7 can be connected with the sealing element 5 chemically and/or mechanically.

The support disk 19 together with the annular flange 8 of the housing 9 secures the individual parts 7, 5 of the shaft seal. The annular spring 17 ensures that even for a possible creeping action of the sealing element 5 the sealing lip 4 is resting under the required pretension force action on the running sleeve 1.

Figure 9:
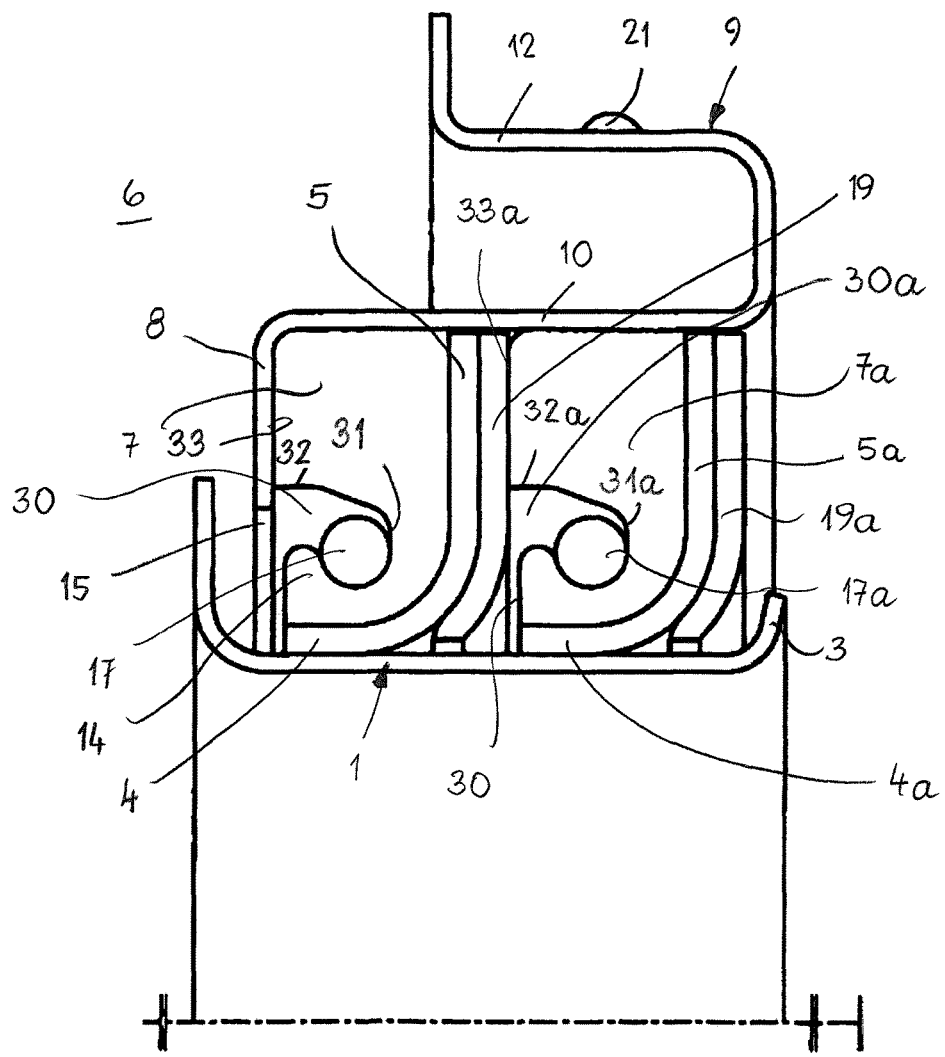

The embodiment according to FIG. 9 differs from the described embodiment in that the sealing element, the elastomer element, and the support disk are provided twice. Since the shaft seal as a result of the duplicate arrangement is wider in the axial direction, the cylinder part 10 of the housing 9 is accordingly also wider than in the preceding embodiment. The elastomer element 7 is again provided between the annular flange 8 of the housing 9 and the sealing element 5. It is contacting with the sealing lip 4 the outer side of the running sleeve 1. The second elastomer element 7a is positioned between the support disk 19 and the sealing element 5a. The sealing element 5a itself is arranged between the elastomer element 7a and the support disk 19a. At least the support disk 19a is attached with its outer rim on the inner side of the cylinder part 10 of the housing 9, as is described with the aid of the preceding embodiment. The sealing elements 5, 5a, the elastomer element 7, 7a, and the support disk 19, 19a can be connected to each other chemically and/or mechanically. The sealing elements 5, 5a, the elastomer elements 7, 7a, and the support disks 19, 19a are arranged with the same orientation behind each other. As a result of this doubled arrangement a reliable sealing action of the medium located at the medium side 6 is provided.

As in the preceding embodiment, on the exterior side of the cylinder part 12 of the housing 9 the sealing device 21 is provided that provides a static sealing action in the mounted position of the shaft seal. The sealing device 21 that extends about the circumference of the cylinder part 12 is elastically deformed in the mounted position of the shaft seal and ensures in this way a reliable static sealing action. The two annular springs 17, 17a force the sealing lips 4, 4a firmly against the running sleeve 1. As a result of the pretension of the annular springs 17, 17a, the sealing action is ensured even when the sealing element 5 should creep minimally.

The funnel-shaped widened end 3 of the running sleeve 1 contributes to an improved centering action during mounting of the shaft seal and can serve as a transport securing means as well as for encapsulation of prelubrication against spreading and contamination.

The free end 14 of the elastomer element 7 does not project, in contrast to the preceding embodiment, into the opening 15 of the annular flange 8. In this way, it is possible to use two identical elastomer elements 7, 7a for the configuration of the shaft seal according to FIG. 9.

Figure 8:
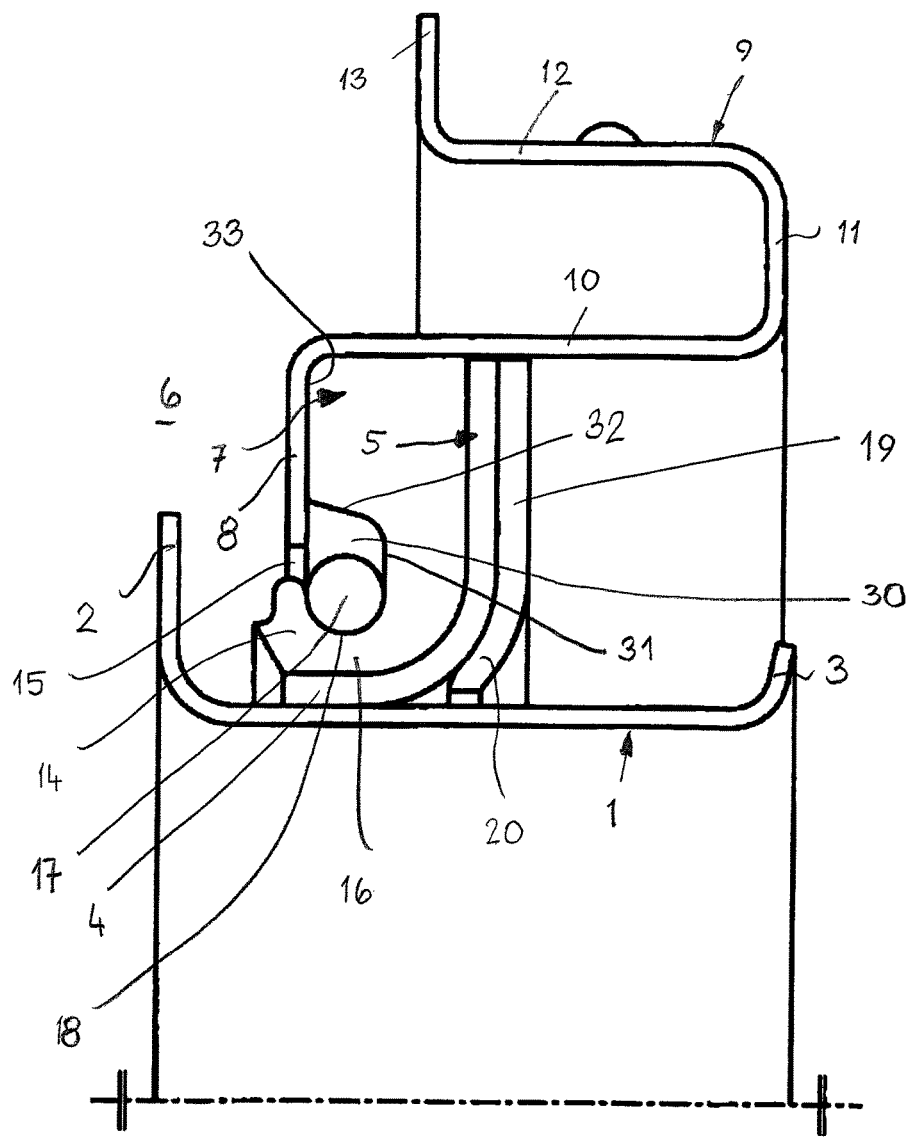

The receiving space 30, 30a of the elastomer part 7, 7a has a greater axial extension than the receiving space 30 of the shaft seal according to FIG. 8. The sidewall 31, 31a has greater spacing from the end face 33, 33a of the elastomer part 7, 7a. The wall 32, 32a that adjoins the sidewall 31, 31a is significantly longer in axial direction than in the preceding embodiment. In turn, the receiving space 30, 30a in radial direction is smaller than the receiving space 30 according to FIG. 8.

Figure 10:
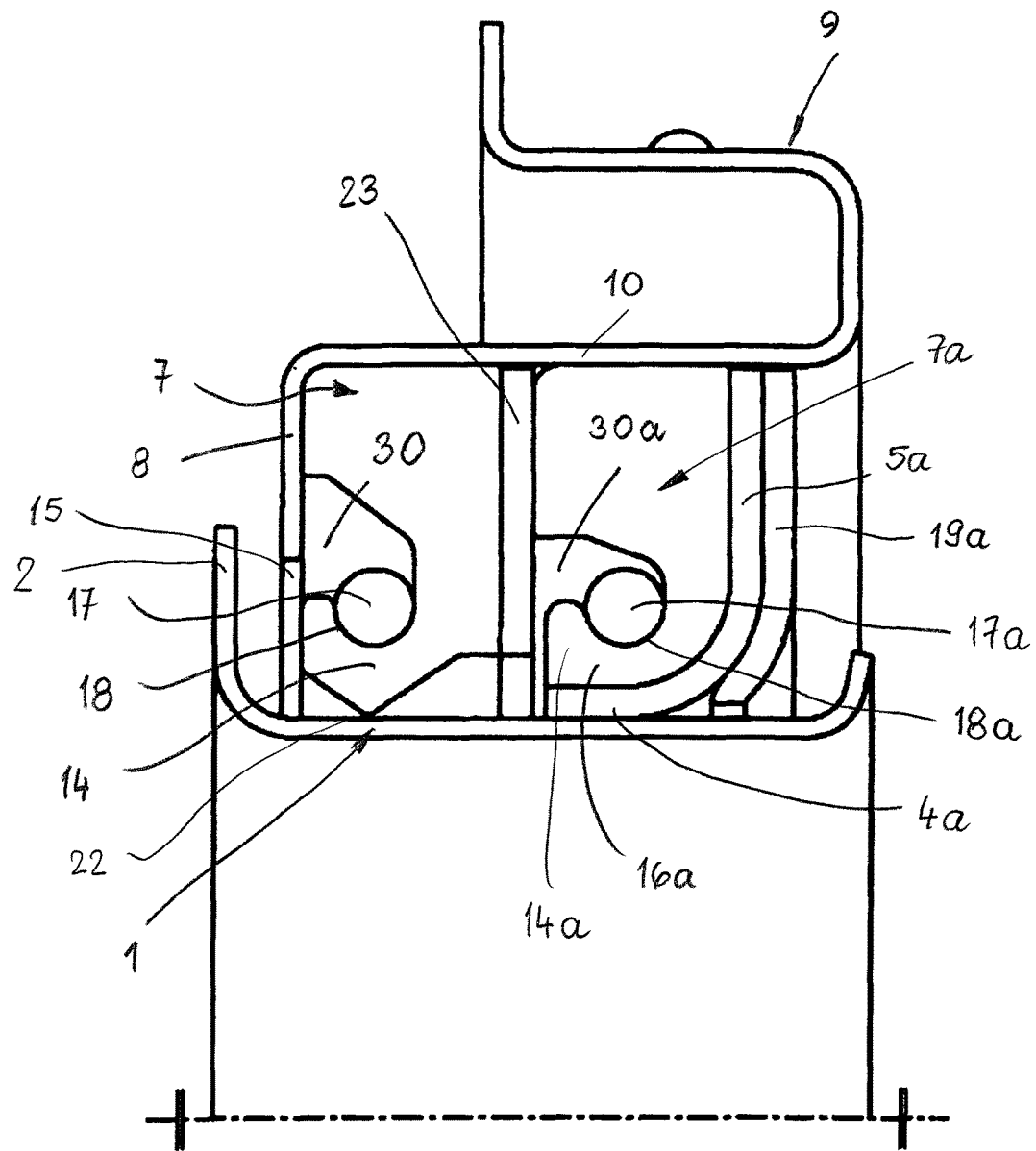

The shaft seal according to FIG. 10 has the elastomer element 7 that with its sealing lip 14 is resting on the outer side of the running sleeve 1. The sealing lip 14 has a sealing edge 22 with which it is resting on the running sleeve 1. The sealing edge 22 contacts with radial pretension the running sleeve 1. For assisting the radial pretension, the annular spring 17 is provided which is inserted into the annular groove 18 of the elastomer element 7. The receiving space 30 of the elastomer part 7 is substantially of the same configuration as in the shaft seal according to FIG. 8. The receiving space 30 according to FIG. 10 is however in radial direction longer than in the embodiment according to FIG. 8.

The elastomer element 7 forms in this embodiment one of the two sealing elements. The elastomer element 7 is supported on the annular flange 8 of the housing 9 as well as on a support disk 23 which is positioned in a radial plane and surrounds at a spacing the running sleeve 1. The support disk 23 can be attached with its outer rim on the inner side of the cylinder part 10 of the housing 9, for example, can be welded thereto when comprised of metallic material. The elastomer element 7 is positioned with its face that is facing the elastomer element 7a flat on the support disk 23 whose radial width matches the corresponding radial width of the contact face of the elastomer element 7. In the embodiment, the free end of the sealing lip 14 does not project into the central opening 15 of the annular flange 8. Of course, the sealing lip 14 can be designed such that it projects, similar to the embodiment according to FIG. 8, into or even through the central opening 15. In this connection, this free end is positioned still with sufficient spacing relative to the annular flange 2 of the running sleeve 1.

The sealing element 5a is of the same configuration as in the embodiment according to FIGS. 8 and 9. It has sealing lip 4a which is resting with radial pretension on the running sleeve 1. The sealing element 5a is secured between the elastomer element 7a and the cover disk 19a which is designed in accordance with the preceding embodiments. The elastomer element 7a is positioned between the two support disks 22 and 19a on which it is resting flat with its two faces. The free end 14a of the elastomer element 7a has axial spacing from the support disk 23. The annular spring 17a which is inserted into the annular groove 18a of the elastomer element 7a exerts a radial pretension force onto the sealing lip 4a of the sealing element 5a. In accordance with the preceding embodiment, the sealing lip-like part 16a of the elastomer element 7 covers the sealing lip 4a on its backside that is facing away from the running sleeve 1. The receiving space 30a is designed in accordance with the receiving space 30a of FIG. 9.

The support disk 19a has, as in the embodiment according to FIG. 9, an axial spacing from the funnel-shaped end 3 of the running sleeve 1. The support disk 19a is fastened on the inner side of the cylinder part 10 of the housing 9 in the described way.

As is illustrated in an exemplary fashion in the embodiment according to FIG. 10, the shaft seal can have differently designed sealing elements. In this case, one sealing element is the elastomer element 7 comprised of elastomer material while the other sealing element 5a is comprised of polyfluorocarbon, preferably, polytetrafluoroethylene.

Figure 6:
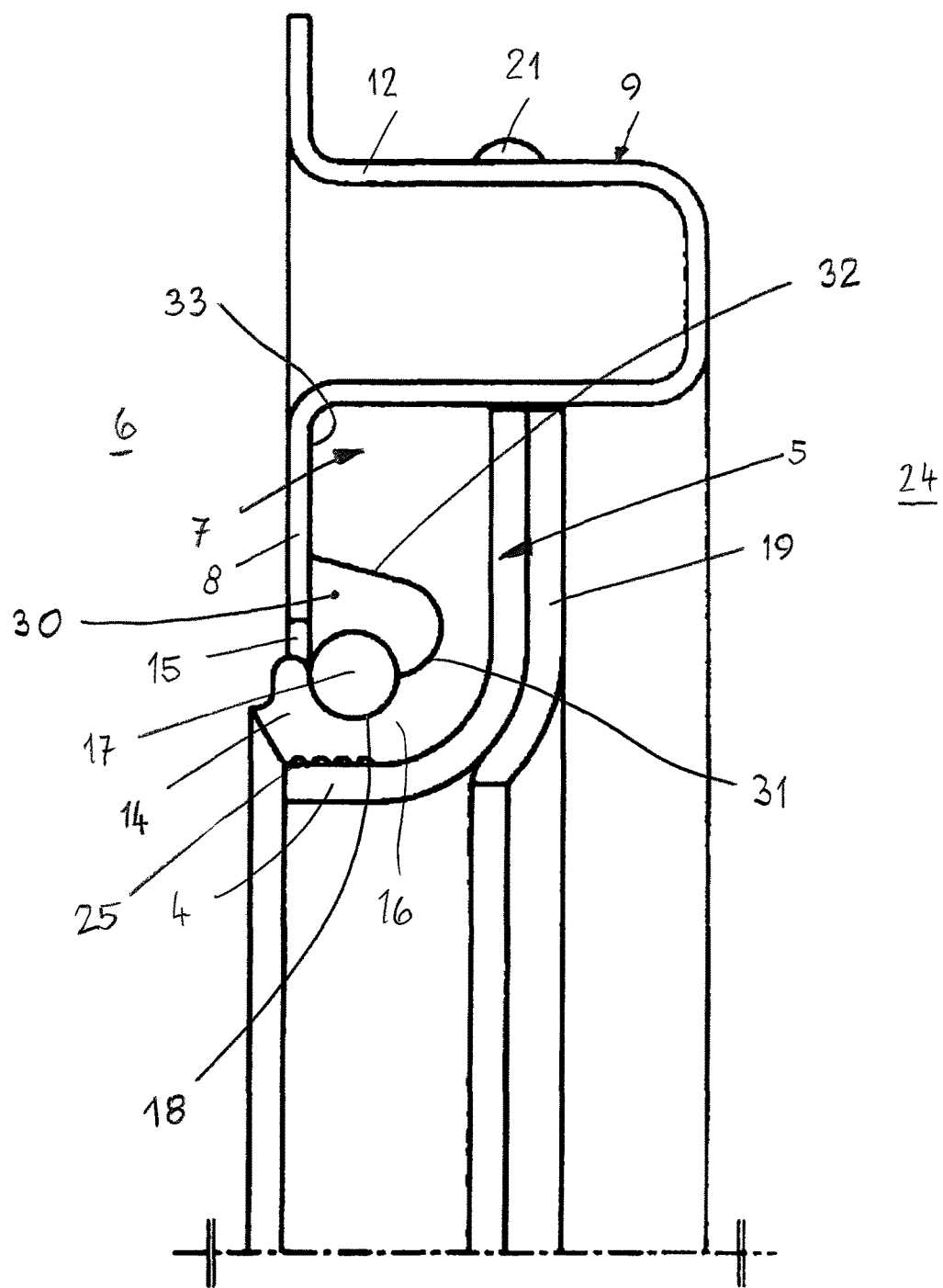
Figure 7A:
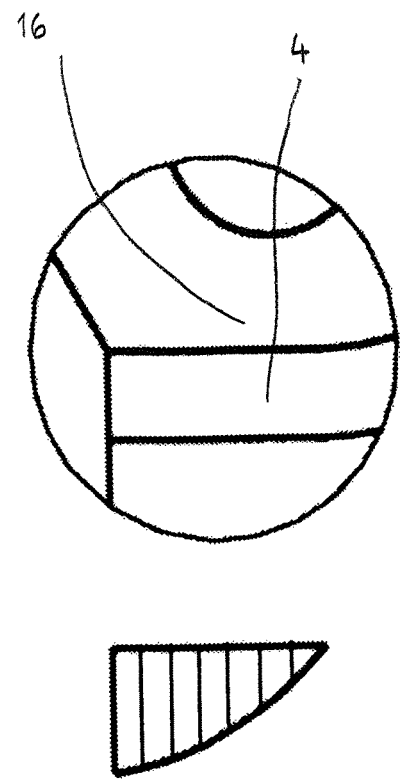
Figure 7:
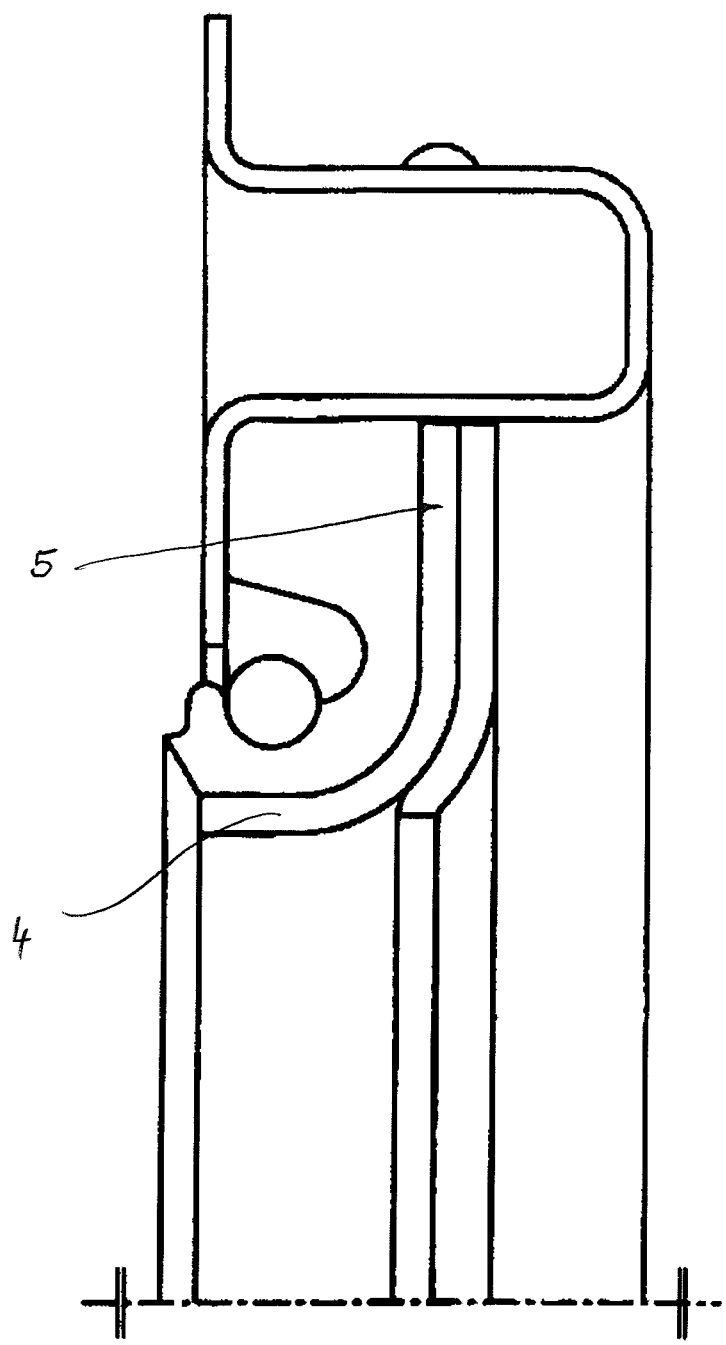

FIGS. 6 and 7 show shaft seals without running sleeve. In these embodiments, the sealing lip 4 of the sealing element 5 is contacting immediately the shaft (not illustrated). The sealing element 5 is positioned between the elastomer element 7 and the support disk 19 which is embodied and arranged in accordance with the embodiment of FIG. 8. The free end 14 of the sealing lip-type part 16 of the elastomer element 7 projects through the central opening 15 of the annular flange 8 of the housing 9. On the cylinder part 12 of the housing 9 there is the sealing device 21 with which the static sealing action is realized.

Since the shaft seal according to FIG. 6 has no running sleeve, it is characterized by a simple constructive configuration. The annular spring 17 ensures the satisfactory radial contact force of the sealing lip 4 on the shaft to be sealed. As in the preceding embodiments, the sealing lip 4 of the sealing element 5 is bent in the direction toward the medium side 6.

The support disk 19 is positioned in accordance with the preceding embodiments on the face of the sealing element 5 that is facing the air side 24.

The receiving space 30 has the sidewall 31 which, in contrast to the preceding embodiments, does not adjoin tangentially but radially the wall of the annular groove 18. The sidewall 31 then passes in a curved shape into the wall 32 which, in turn, adjoins at an obtuse angle the end face 33 of the elastomer part 7. As a result of the radial connection of the sidewall 31 to the wall of the annular groove 18, the medium which is contained in the receiving space 30 exerts a radial pressure onto the sealing lip-shaped part 16 of the elastomer part 7 and thus onto the sealing lip 4 of the sealing element 5. Accordingly, the contact force of the sealing lip 4 can be achieved by an appropriate hydraulic assistance by means of the elastomer part 7. With a corresponding configuration of the receiving space 30, the contact force of the sealing lip 4 can thus be adjusted additionally.

In this embodiment, the contact force distribution can thus be matched by interaction of the design of the profiled structure 25 and the receiving space 30 to the application situation of the shaft seal in an excellent manner.

Figure 6A:
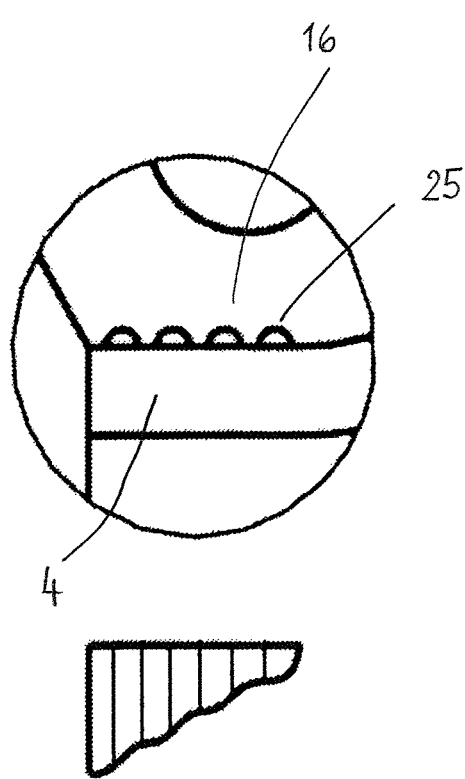

The elastomer element 7 has in the area of the sealing lip 4 of the sealing element 5 at its contact side a profiled structure 25. In an exemplary fashion, this profiled structure is wave-shaped in axial section. The webs that are existing between neighboring depressions of the profiled structure 25 are elastically deformed by the radial pressure that is exerted by the annular spring 17. The profiled structure 25 of the sealing lip-shaped part 16 of the elastomer element 7 results in a special force distribution, as illustrated in FIG. 6a. Here, the force distribution is illustrated across the axial width of the profiled structure 25. As a result of the web of the profiled structure 25, the course of the force distribution can be affected. The force distribution is not continuous across the axial width of the profiled structure but is discontinuous in the area of the webs between the depressions the profiled structure. Accordingly, the course of the radial contact force of the sealing lip 4 onto the shaft or onto the running sleeve 1 can be affected by appropriate design of the profiled structure 25. The radial contact force decreases beginning at the free end of the sealing lip 4.

The sealing lip 4 or the entire sealing element 5 has only a very minimal thickness so that it has the force distribution that is generated by the profiled structure 25, as shown in FIG. 6a.

The embodiment according to FIG. 5 differs from the shaft seal according to FIG. 6 in that the part 16 of the elastomer element 7 has no profiled structure and that therefore the sealing lip 4 of the sealing element 5 on its side that is facing the shaft to be sealed is provided with a return conveying device 26. It ensures that medium that has escaped between the sealing lip 4 and the shaft is returned to the medium side 6. The return conveying device 26 can be designed such that it generates the return conveying action only in one rotational direction of the shaft. However, it is also possible to design the return conveying device 26 such that a return conveying action of the medium is possible in both rotational defections of the shaft. Since both types of return conveying devices are known, they are not described in detail. In other respects, the shaft seal according to FIG. 5 is of the same configuration as the embodiment of FIG. 6.

The sealing lip 4 can also have such a return conveying device at its outer side. Finally, the return conveying device can be provided only on the outer side of the sealing lip 4.

The embodiment according to FIG. 7 corresponds substantially to the embodiment according to FIG. 5. The only difference resides in that the sealing lip 4 of the sealing element 5 has no return conveying device at its side contacting the shaft. The embodiment differs also relative to the embodiment according to FIG. 6 only in that a profiled structure is not provided in the area 16 of the elastomer part 7. As can be seen in FIG. 7a, this has the result that, in contrast to the embodiment of FIG. 6, 6a, a continuous radial contact force distribution across the axial width of the sealing lip 4 results. The contact force decreases continuously beginning at the free end of the sealing lip 4.

A comparison of FIGS. 6, 6a and 7, 7a shows that with a corresponding design of the area 16 of the elastomer part 7 the force distribution can be optimally adjusted to the respective application situation.

The contact pressure distribution can be realized to be dependent or independent of the rotational direction.

FIGS. 1 to 4 show different embodiments of the running sleeve 1. In the embodiment according to FIG. 1, the running sleeve 1 has a cylindrical wall 27 which at one end passes into the angular flange 2 and at the other end into the funnel-shaped widened end 3.

In the embodiment according to FIG. 2, the wall 27 as a wave-shaped profile that advantageously is provided across the entire axial length of the wall 27. This wave-shaped profiled structure is advantageously designed uniformly, i.e., the waves have the same depth and the same axial width. Such a design of the profiled structure is however not mandatory. The waves can also be non-uniformly designed and/or may be provided only across a portion of the axial length of the wall 27. The wave-shaped profiled structure can be used as a lubricant reservoir so that the sealing lip 4 is always lubricated and therefore is subjected only to little wear.

The wall 27 of the running sleeve 1 according to FIG. 3 can be provided on the outer side with a profiled structure 28 in the form of punctiform depressions. They serve advantageously as lubricant pockets by means of which a reliable lubrication of the sealing lip 4 resting on the running sleeve 1 is ensured.

FIG. 4 shows an embodiment in which the wall 27 of the running sleeve 1 is provided with a swirl structure 29 by means of which also a return conveying action of medium in the direction of the medium side 6 is achieved. The swirl structure 29 can be designed such that it is effective only in one rotational direction of the shaft. However, it is also possible to design this swirl structure 29 such that a rotational direction-independent return conveying action of the medium to be sealed is ensured. The swirl structure 29 extends advantageously across the entire axial length of the wall 27.

The components of the shaft seal that have been described with the aid of the various embodiments can be used together in various constellations. Accordingly, the illustrated embodiments are not be understood as limiting. For example, the running sleeves 1 according to the FIGS. 1 to 4 can be provided in any of the described shaft seal embodiments.

The elastomer elements 7 can be used also without annular springs 17. In this case, the radial force that is exerted by the part 16 of the elastomer element 7 is used in order to force the sealing lip 4 of the sealing element 5 against the running sleeve 1 or directly against the shaft to be sealed. The elastomer element 7 in this case is designed such that its area 16 generates this radial pretension force.

In the illustrated embodiments, the sealing lip 4 of the sealing element 5 is bent always in the direction toward the medium side 6. However, it is also possible to bend the sealing lip 4 in the direction toward the air side 24.

When two adjacently positioned sealing elements 5 are used, then the sealing lips 4, 4a of both sealing elements 5, 5a can also be directed in the direction of the air side 24. Also, it is possible that one sealing lip is oriented in the direction of the medium side 6 and the other sealing lip is oriented in the direction toward the air side 24. In which direction the sealing lip 4 extends depends on the application situation of the shaft seal.

The elastomer element 7 can also be differently designed as can be seen, for example, in the FIGS. 9 and 10. In the embodiment according to FIG. 10, instead of the elastomer element 7 with the sealing edge 22 also an elastomer element 7 can be used, as illustrated, for example, in FIG. 9. In this case, the part 16 of the elastomer element 7 is resting of the running sleeve 1. In this case, the area 16 of the elastomer element 7 can be provided on its contact side with a swirl structure that ensures a return conveying action of the medium to the medium side 6. Such a swirl structure can be designed such that it is acting only in one rotational direction of the running sleeve 1 or of the shaft or in both rotational directions.

The swirl structures in the sealing lip 4, 4a of the sealing element 5, 5a and/or in the areas 16 of the elastomer element 7 can be embossed, turned, ground, lasered, injection-molded and the like. The swirl structure can be provided not only on the swirl element 5 and/or on the elastomer element 7 but also on the opposite running surface, i.e., on the wall 27 of the running sleeve 1 or on the shaft to be sealed.

The running sleeves 1 according to FIGS. 1 to 4, in particular the profiled running sleeves according to FIGS. 2 to 4, can be used also in shaft seals that have a conventional configuration. The use of the running sleeves 1 is thus not limited to the disclosed shaft seals.

What is claimed is:

1. A shaft seal comprising:
   a sealing element of polyfluorocarbon that is provided with a sealing lip, wherein the sealing lip is contacting a surface to be sealed under a radial force action acting in a radial direction of the shaft seal;
   an elastomer element that is acting on the sealing lip and loads the sealing lip in a direction toward the surface to be sealed, wherein the elastomer element does not contact the surface to be sealed;
   a housing comprising a cylinder part and a radially inwardly oriented annular flange monolithically connected to a first axial end of the cylinder part and extending radially inwardly away from the cylinder part;
   a support element provided at the housing and positioned opposite the annular flange, wherein the support element is an annular disk comprising a first annular face and a second annular face extending parallel to each other and a radial outer circumferential rim connecting the first and second annular faces to each other without projecting axially past the first and second annular faces, wherein the radial outer circumferential rim is facing the cylinder part, wherein the radial outer circumferential rim is fastened circumferentially directly to an inner wall surface of the cylinder part of the housing, and further comprising a radial inner area with a curved portion curved in a direction toward the annular flange, wherein the curved portion is resting against a curved transition of a main body of the sealing element into the sealing lip;
   wherein the support element forms an axial outermost closure part as a first axial end of the shaft seal and wherein an exterior side of the support element that is facing away from the sealing element forms an exterior surface of the support element exposed to air at the air side of the shaft seal;
   wherein the sealing element and the elastomer element are arranged in the housing between the annular flange and the support element and are covered radially outwardly by the cylinder part, wherein the annular flange forms a second axial end of the shaft seal opposite the first axial end formed by the support element;
   wherein the elastomer element is arranged between the annular flange and the sealing element;
   wherein the elastomer element comprises a main member and a sealing lip part connected to the main member, wherein the elastomer element has a first exterior face extending across an entire radial length of the main member and a second exterior face that is axially opposite the first exterior face and extends across the main member and the sealing lip part;
   wherein the elastomer element is resting with the first exterior face across the entire radial length of the main member flat on the annular flange and is resting with the second exterior face flat on a first face of the sealing element;
   wherein the elastomer element comprises a receiving space delimited by the main member and the sealing lip part and delimited partially by the annular flange of the housing;
   wherein the sealing element comprises a second face opposite the first face and the second face is resting on the support element.

2. The shaft seal according to claim 1, wherein the elastomer element supports the sealing element axially.

3. The shaft seal according to claim 1, wherein the second exterior face of the elastomer element is facing away from a medium side of the shaft seal.

4. The shaft seal according to claim 1, wherein the sealing lip part of the elastomer element is resting radially on the sealing lip of the sealing element under the radial force action.

5. The shaft seal according to claim 4, further comprising at least one spring arranged radially aligned with the sealing lip, wherein the sealing lip part is loaded by the at least one spring in the radial direction.

6. The shaft seal according to claim 1, wherein the sealing element is an annular disk.

7. The shaft seal according to claim 1, wherein the support element is contacting a radially extending part of the sealing element and a transition connecting the radially extending part with the sealing lip.

8. The shaft seal according to claim 1, wherein the surface to be sealed is a wall surface of a shaft or of an axle to be sealed by the shaft seal.

9. The shaft seal according to claim 1, wherein the surface to be sealed is a wall surface of a running sleeve that is fixedly secured on a shaft or on an axle to be sealed by the shaft seal.

10. A shaft seal comprising:
a first sealing element of polyfluorocarbon that is provided with a first sealing lip, wherein the first sealing lip is contacting a surface to be sealed under a radial force action acting in a radial direction of the shaft seal;
a first elastomer element that is acting on the first sealing lip and loads the first sealing lip in a direction toward the surface to be sealed, wherein the first elastomer element does not contact the surface to be sealed;
a housing comprising a cylinder part and a radially inwardly oriented annular flange monolithically connected to a first axial end of the cylinder part and extending radially inwardly away from the cylinder part;
a first support element provided at the housing and positioned opposite the annular flange, wherein the first support element is an annular disk comprising a first annular face and a second annular face extending parallel to each other and a first radial outer circumferential rim connecting the first and second annular faces to each other without projecting axially past the first and second annular faces, wherein the radial outer circumferential rim is facing the cylinder part, wherein the first radial outer circumferential rim is fastened circumferentially directly to an inner wall surface of the cylinder part of the housing, and further comprising a radial inner area with a curved portion curved in a direction toward the annular flange, wherein the curved portion is resting against a curved transition of a main body of the first sealing element into the first sealing lip;
wherein the first sealing element and the first elastomer element are arranged in the housing between the annular flange and the first support element and are covered radially outwardly by the cylinder part;
wherein the first elastomer element is arranged between the annular flange and the first sealing element;
wherein the first elastomer element comprises a main member and a sealing lip part connected to the main member, wherein the first elastomer element has a first exterior face extending across an entire radial length of the main member and a second exterior face that is axially opposite the first exterior face and extends across the main member and the sealing lip part;
wherein the first elastomer element is resting with the first exterior face across the entire radial length of the main member flat on the annular flange and is resting with the second exterior face flat on a first face of the first sealing element;
wherein the first elastomer element comprises a receiving space delimited by the main member and the sealing lip part and delimited partially by the annular flange of the housing;
wherein the first sealing element comprises a second face opposite the first face and the second face is resting on the first support element;
a second sealing element of polyfluorocarbon and a second support element positioned axially adjacent to each other on a side of the first support element opposite the first sealing element, wherein the second sealing element has a first face that contacts the second support element, wherein the second sealing element is provided with a second sealing lip which is contacting the surface to be sealed under a radial force action acting in a radial direction of the shaft seal;
a second elastomer element positioned between the first support element and the second sealing element and loading the second sealing lip in a direction toward the surface to be sealed, wherein the second elastomer element does not contact the surface to be sealed;
wherein the second support element is an annular disk comprising a first annular face and a second annular face extending parallel to each other and a second radial outer circumferential rim connecting the first and second annular faces to each other without projecting axially past the first and second annular faces, wherein the second radial outer circumferential rim is facing the cylinder part, wherein the second radial outer circumferential rim is fastened circumferentially directly to the inner wall surface of the cylinder part of the housing;
wherein the second support element forms an axial outermost closure part of the shaft seal and wherein an exterior side of the second support element that is facing away from the second sealing element forms an exterior surface of the second support element exposed to air at the air side of the shaft seal;
wherein the first elastomer element is supported in an axial direction of the shaft seal on the annular flange and on the first sealing element, wherein the second elastomer element is supported in the axial direction of the shaft seal on the first support element and on the second sealing element, wherein the first elastomer element and the second elastomer element exert an axial force on the first and second sealing elements.

11. The shaft seal according to claim 10, wherein the second elastomer element is acting directly on the second sealing lip and loads the second sealing lip toward the surface to be sealed, and wherein the second sealing element has a second face that contacts the second elastomer element.

12. The shaft seal according to claim 1, wherein the elastomer element has a rotational direction-dependent or rotational direction-independent structure or geometry relative to the sealing element.

13. The shaft seal according to claim 1, wherein the sealing lip has a rotational direction-dependent or rotational direction-independent structure or geometry.

14. The shaft seal according to claim 13, wherein the structure or geometry is provided at a running side and/or an outer side of the sealing lip.

15. The shaft seal according to claim 1, wherein a running sleeve is provided on an axle or shaft to be sealed by the shaft seal, wherein a wall surface of the running sleeve is profiled.

16. The shaft seal according to claim 1 in the form of a radial shaft seal, wherein the polyfluorocarbon is polytetrafluoroethylene.

17. The shaft seal according to claim 1, wherein the radial outer circumferential rim of the annular disk is welded circumferentially to the inner wall surface of the cylinder part.

* * * * *